(12) United States Patent
Vissa et al.

(10) Patent No.: US 10,793,311 B2
(45) Date of Patent: *Oct. 6, 2020

(54) METHOD AND APPARATUS FOR ENERGY AND WATER EFFICIENT LABELING

(71) Applicants: Ramgopal Vissa, Hyderbad (IN); Jainagesh Sekhar, Cincinnati, OH (US); Venkata Burada, Mason, OH (US); Sajja Sriramu, Hyderbad (IN); Mark Reusch, Cincinnati, OH (US)

(72) Inventors: Ramgopal Vissa, Hyderbad (IN); Jainagesh Sekhar, Cincinnati, OH (US); Venkata Burada, Mason, OH (US); Sajja Sriramu, Hyderbad (IN); Mark Reusch, Cincinnati, OH (US)

(73) Assignee: MHI Health Devices, LLC, Cincinnati, OH (US)

( * ) Notice: Subject to any disclaimer, the term of this patent is extended or adjusted under 35 U.S.C. 154(b) by 516 days.

This patent is subject to a terminal disclaimer.

(21) Appl. No.: 14/857,863

(22) Filed: Sep. 18, 2015

(65) Prior Publication Data
US 2016/0083134 A1   Mar. 24, 2016

Related U.S. Application Data

(60) Provisional application No. 62/052,620, filed on Sep. 19, 2014.

(51) Int. Cl.
*B65C 9/26* (2006.01)
*B65C 3/00* (2006.01)
*B65C 9/02* (2006.01)
*B29C 63/00* (2006.01)
*B65B 53/06* (2006.01)
(Continued)

(52) U.S. Cl.
CPC ............ *B65C 9/26* (2013.01); *B29C 63/0065* (2013.01); *B29C 63/0073* (2013.01); *B65B 53/04* (2013.01); *B65B 53/063* (2013.01); *B65C 3/00* (2013.01); *B65C 9/02* (2013.01); *B29L 2031/744* (2013.01)

(58) Field of Classification Search
CPC ............................ B65C 9/26; B29C 63/0065
See application file for complete search history.

(56) References Cited

U.S. PATENT DOCUMENTS

| | | | | |
|---|---|---|---|---|
| 3,034,726 A | * | 5/1962 | Peras | ......................... B05B 1/24 239/132 |
| 3,783,236 A | * | 1/1974 | Edin | ..................... F24H 3/0405 219/401 |
| 4,169,707 A | | 10/1979 | Gloeckler | |

(Continued)

FOREIGN PATENT DOCUMENTS

| | | | | |
|---|---|---|---|---|
| CN | 2847046 Y | * | 12/2006 | ............... F22G 3/00 |
| CN | 102777888 A | * | 11/2012 | ............... F22G 3/00 |
| EP | 2103527 A1 | * | 9/2009 | ........... B65B 53/063 |

*Primary Examiner* — Jeffry H Aftergut
*Assistant Examiner* — Jaeyun Lee
(74) *Attorney, Agent, or Firm* — Michael C. Connelly (57) ABSTRACT

An apparatus and method for the application of labels to packaging employing the application of superheated steam or other fluids in an enclosed space at atmospheric pressure are presented. Such an apparatus and method will more effectively, efficiently and safely attach shrink labeling to consumer packaged goods (CPG) with enhanced time, water and energy savings.

10 Claims, 6 Drawing Sheets

(51) Int. Cl.
*B65B 53/04* (2006.01)
*B29L 31/00* (2006.01)

(56) References Cited

U.S. PATENT DOCUMENTS

| | | | |
|---|---|---|---|
| 4,485,059 A * | 11/1984 | Krutchen | B29C 44/5636 |
| | | | 264/321 |
| 5,544,470 A * | 8/1996 | Yarbrough | B65B 53/02 |
| | | | 53/213 |
| 5,711,086 A | 2/1998 | Stubbing | |
| 8,119,954 B2 | 2/2012 | Vissa | |
| 8,196,376 B2 | 6/2012 | Uetsuki et al. | |
| 8,235,712 B1 | 8/2012 | Lewis | |
| 8,435,459 B2 | 5/2013 | Reddy | |
| 8,940,245 B2 | 1/2015 | Reddy | |
| 2009/0159591 A1 * | 6/2009 | Tomita | B24B 49/105 |
| | | | 219/628 |
| 2013/0306103 A1 * | 11/2013 | Huber | A47L 11/4086 |
| | | | 134/6 |
| 2014/0326413 A1 * | 11/2014 | Gotz | B32B 37/1207 |
| | | | 156/497 |
| 2017/0129634 A1 * | 5/2017 | Uetsuki | B65B 61/202 |

* cited by examiner

METHOD AND APPARATUS FOR ENERGY AND WATER EFFICIENT LABELING

CROSS-REFERENCE TO RELATED APPLICATIONS

This application claims the benefit of U.S. provisional application 62/052,620 filed on Sep. 19, 2014 by the applicant. This application also utilizes features disclosed in U.S. Pat. No. 8,119,954 issued on Feb. 21, 2012 entitled "Convective Heating System For Industrial Applications", U.S. Pat. No. 8,435,459 issued on May 27, 2013 entitled "Heating and Sterilizing Apparatus and Method of Using Same", U.S. Pat. No. 8,940,245 issued on Jan. 27, 2015 entitled "Apparatus and Method for Sterilizing Items" and U.S. patent application Ser. No. 14/425,086 entitled "One Atmosphere Boiler Instant Superheated Steam Apparatus and Method" filed on Nov. 14, 2007 the disclosures of which are hereby incorporated by reference herein in their entireties.

BACKGROUND

Shrink labeling for the Consumer Packaged Goods (CPG) industry may be accomplished with hot-air or steam. However, some common hot-air process problems exist. Possible high distortion utilizing hot-air may lead to slow production. Though hot-air production systems have a lower capital cost, sometimes the sheen of the labels is adversely affected during the process.

A boiler steam process may be used instead. Problems commonly reported with boiler steam are stickiness of, and residual water underneath, the labels. Boiler steam production and use can be very capital intensive, requiring boiler certifications and, often, specialized nozzles. There is also a huge loss of energy in the necessary hot piping. Steam piping from boilers can have long runs and, as such, lower the efficiency of the system. A new method and system is needed to overcome these current deficiencies and is disclosed herein.

The steam generator presently described may be employed for such labeling and other applications. The steam produced in the described system is offered with a low capital cost structure and will produce high label quality. With this system, high energy efficiency savings are possible up to 50-95% over traditional boiler steam. As an example; changing from traditional 80 kW generation to the present apparatus and method of (4-12) kW saves, per year, in the range of $60000-$65000 at $0.10/KW hr, assuming continuous operations. The cost of changing over to the present system could be as small as $1000 per month for a normal 4 year period of purchase amortization. The return on investment is potentially high. One of the additional benefits of the present system is the ability to mix and match bottle sizes without a need to change any set-up. There is no need to be restricted to a one belt-line either. The disclosed steam generation equipment can be placed adjacent to the label shrinkage machine. Operation speed may increase 10 fold while enjoying increased energy efficiency and mix and match features. The system also may be installed within a few hours. In addition, no certifications are required as there are no boilers. The smaller size of the system allows relocation as desired as well.

SUMMARY

This application discloses an energy efficient apparatus and method where steam is generated and then superheated to a level over 100° C. A preferable temperature may be about 110-500° C. and, possibly, up to 1000° C. The superheated steam is then projected into an enclosed area such as a container or a tunnel wherein bottles or other packaging are to be held. Shrink labels, which are commonly known in the art, are pre-positioned on containers, bottles or other items. These items are then placed in, for a specific period of time, or conveyed through at a specific rate, the enclosed area in which the superheated steam is being projected. After exposure, the labels will be shrink-fitted to the item or container. The apparatus may or may not have a conveying means to propel the items through the superheated steam atmosphere produced by the steam generator. The steam generator and superheating device may be the type as is described below or other equivalent means.

It has been determined that applied steam, can perform CPG labeling at less than a 1 second residence time. For CPG, the temperature required is about 120° C.-300° C. In this temperature range, less than a 1 second residence time is required for maximum shrinkage. In one perceived embodiment numerous smaller belts (conveyors) having varying speeds, heights, etc. may be employed. Numerous entry points for the steam or hot gas are anticipated. Hot steam can transfer anti-microbial properties to the treated items and make them glossier as well. The steam entry points may be designed to maximize conveyor time and shrinkage rates to accommodate oddly shaped items thus treated (different rates and volumes of steam application for differing shaped portions of an item). Such has not been possible in any system prior to this apparatus. Units with plastic belts and one or more tunnels with direct steam entry points and one final heat air entry point can reduce cost immensely. New unit kits and retrofit kits for bridging energy efficiency to old units are contemplated. Water savings when going to OABs over Boilers can be almost 300 Kg/hr when going from 304 kW to 4 kW. A savings of up to 300 kW every run is contemplated.

DRAWINGS

Figures

| DRAWINGS - REFERENCE NUMERALS | |
|---|---|
| 10. labeling apparatus | 15. stand |
| 20. fluid superheater | 22. fluid aperture |
| 24. fluid connection | 26. fluid reservoir |
| 28. pump | 40. containment chamber |
| 42. chamber entrance | 44. chamber exit |
| 60. conveyance means | 80. controller |
| 82. power hookup | 84. transformer |
| 100. auxiliary heater | |

DETAILED DESCRIPTION

Figure 1:
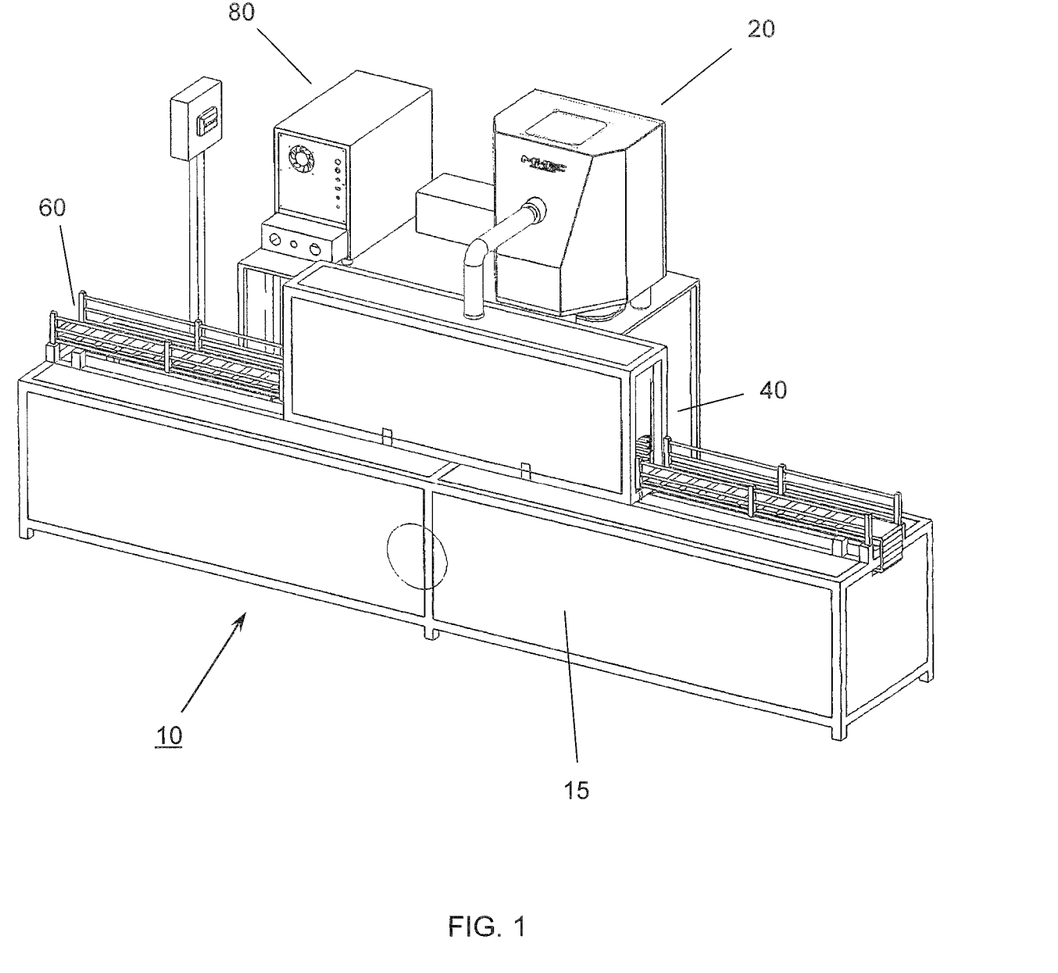
FIG. 1 is an embodiment of a water efficient labeling apparatus.
Figure 2:
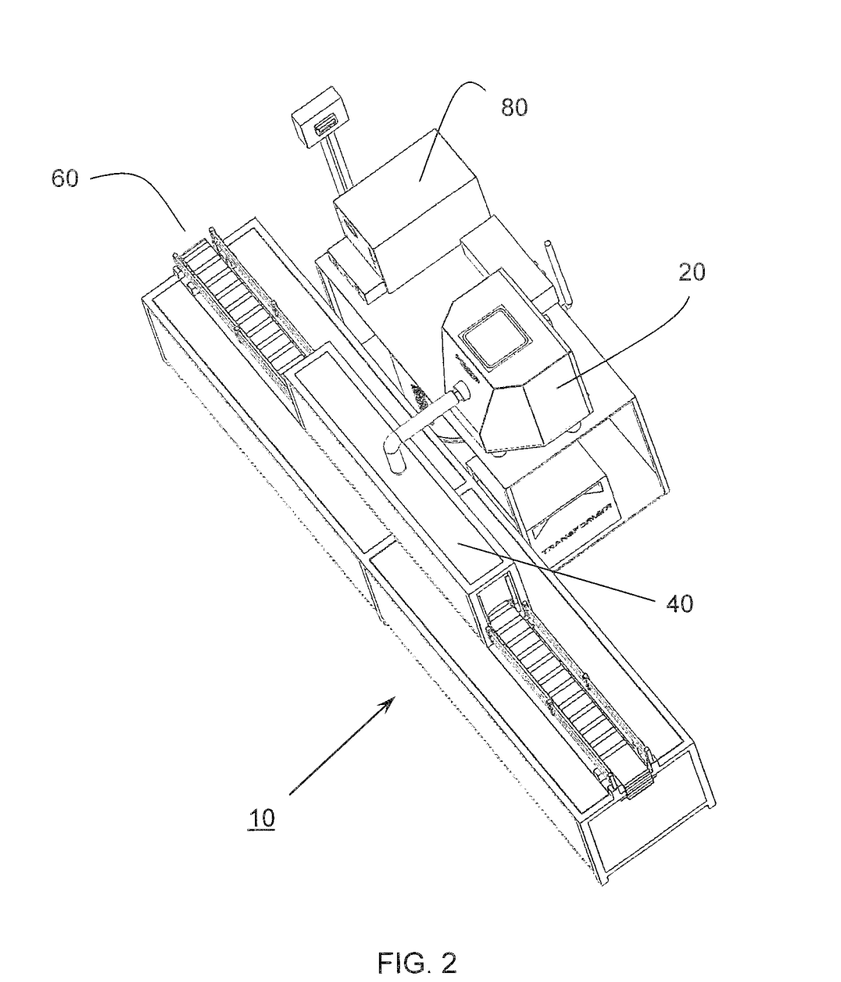
FIG. 2 is top view of the water efficient labeling apparatus.
Figure 3:
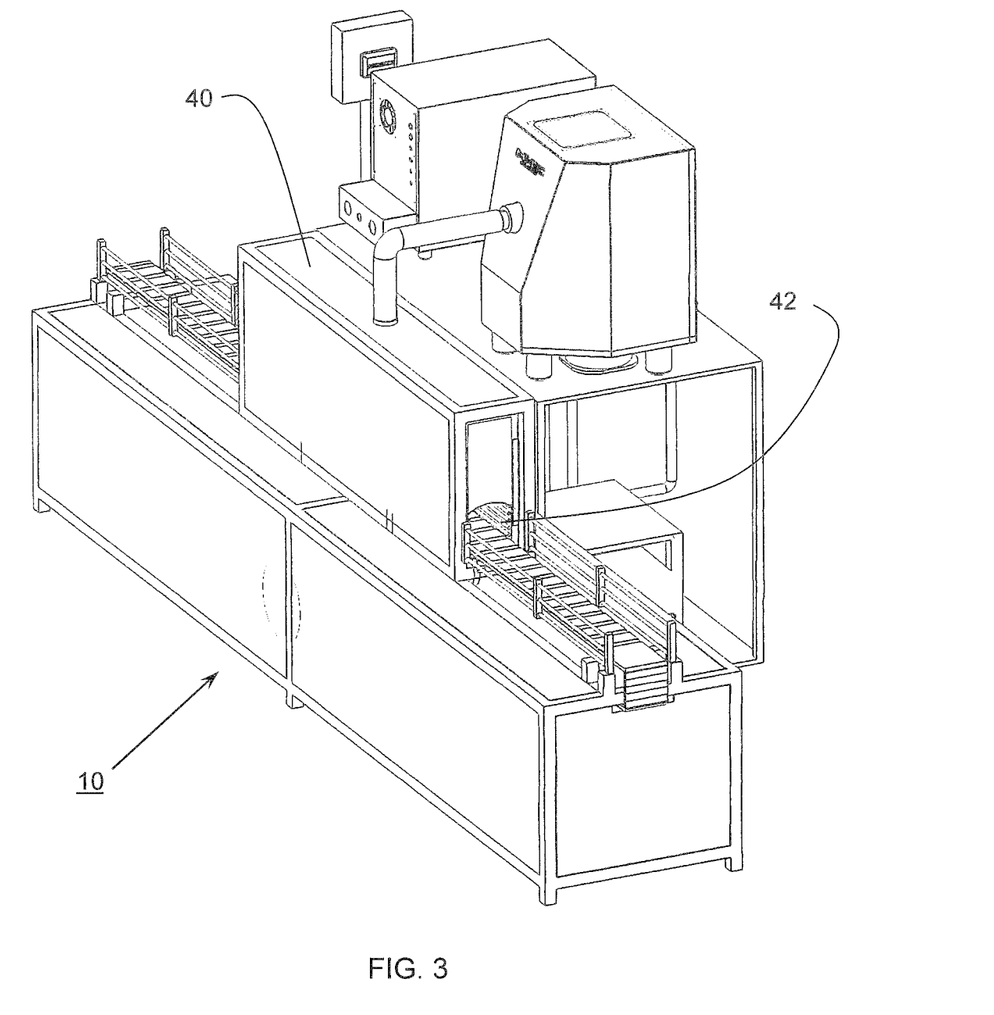
FIG. 3 is a side view of the water efficient labeling apparatus showing the chamber entrance.
Figure 4:
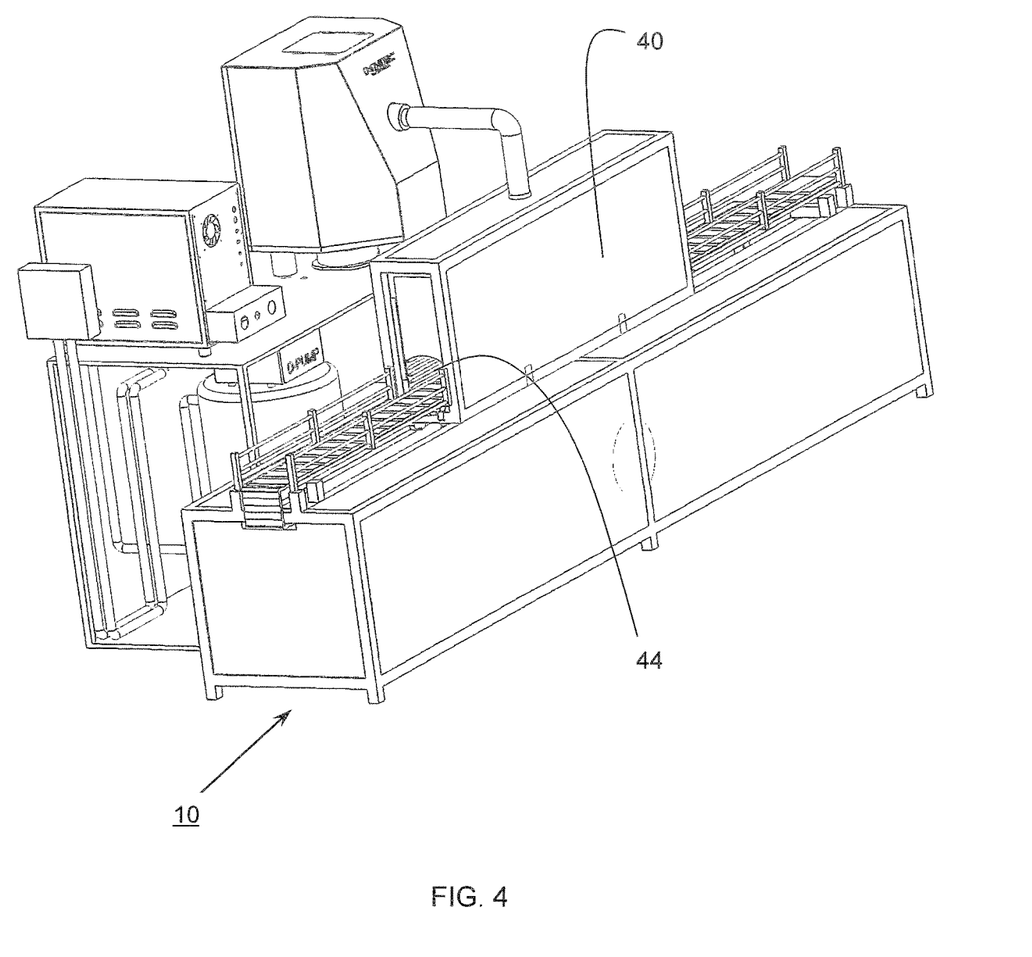
FIG. 4 is a side view of the water efficient labeling apparatus showing the chamber exit.
Figure 5:
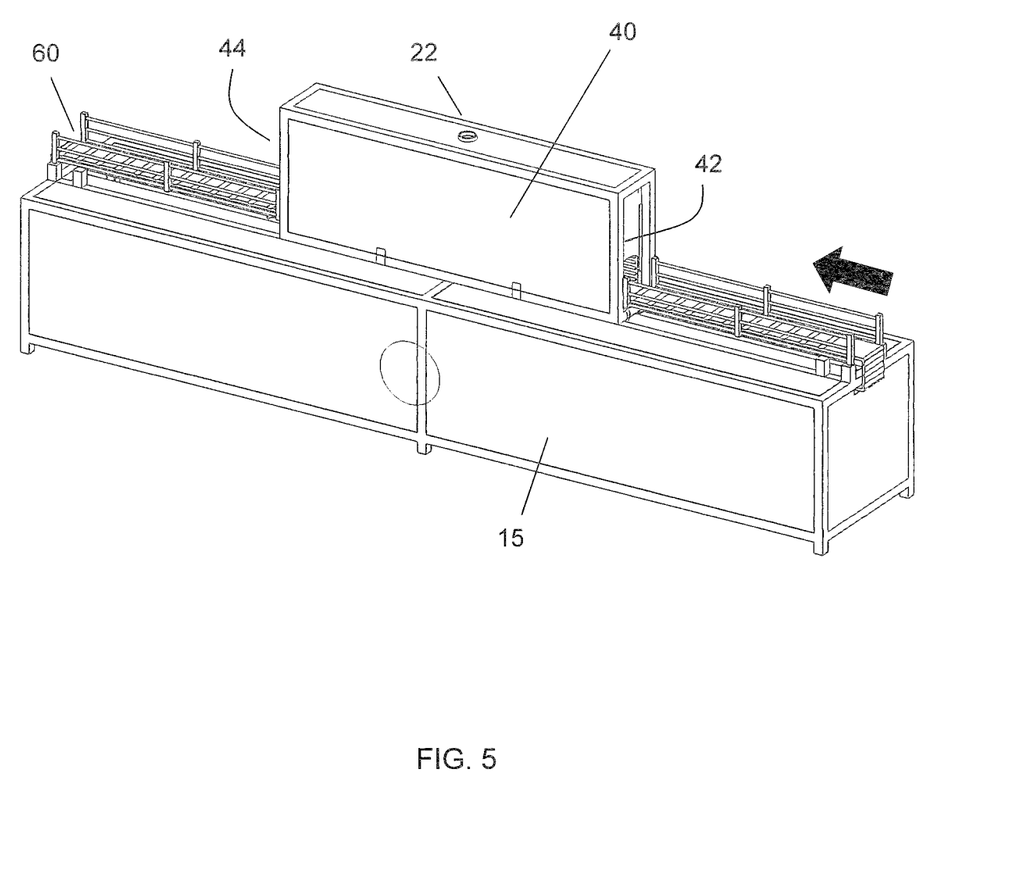
FIG. 5 is a view of the fluid chamber and conveyor assembly for the labeling apparatus.
Figure 6:
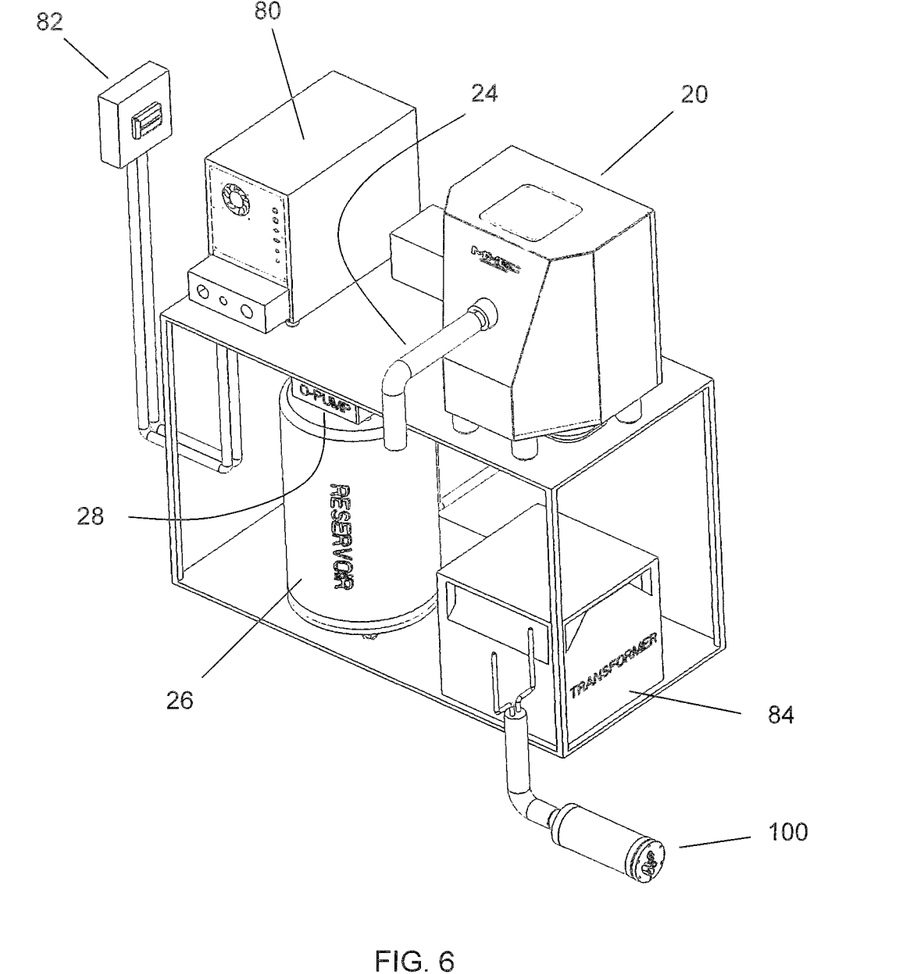
FIG. 6 is a view of the fluid supply, control and heating systems of the labeling apparatus.

An embodiment of the present apparatus is depicted in FIGS. 1-6. A steam generator (other fluids including ion containing fluids are contemplated as well) is attached to a containment area that may or may not be equipped with a conveying means. Steam is produced and then superheated by the generator. The superheated steam generator may be of the type disclosed in U.S. patent application Ser. No. 14/425,086 which is incorporated by reference in its entirety. In such a superheated steam generator as disclosed in Ser. No. 14/425,086 a mist of water, or, in certain cases, other fluid, is projected directly on an electrically powered hot surface or bare electrically coupled heating elements where it is instantly transformed into superheated steam. Any well-insulated heater containing heated surfaces capable of achieving appropriate temperatures on which water droplets (or other liquids) can be converted to high temperature steam (or fluid) is contemplated and may be utilized. Configurations of heaters and coils composed of materials that have P, B, C, Ni, Fe, Mo, Cr, Si, Al, O and rare earths are envisioned as well.

Large amounts of energy are quickly transferred during the rapid formation of superheated steam as well as during the large expansion in volume of the water droplets to steam during the process. In this type of application, such a rapid formation of superheated steam is new to the art. The rapid expansion of the droplets into steam and the resulting energy release helps to propel the steam out of the steam generator and onto objects and surfaces within the chamber. Atomized droplets constitute an unstable fluid stream. During the operation of this apparatus, unstable fluid streams impact on hot surfaces and form electrons in the conduction band which may provide the advantages described herein. In particular, the mist or unstable fluid stream (unstable fluid morphology) impinges on a very hot surface, preferably where electrons are in the conduction band, and due to this, causes instant boiling. The hot surface is envisioned as being an electric heating element or a metal, ceramic or plastic-like surface. The spinodal region of the $P_{sat}/T_{sat}$ curve is avoided and thus high purity gas (waterless steam) is produced. Films of trapped steam that normally reduce boiling efficiency are overcome by the present application. Boiling films that are problems in normal boilers can be avoided. Other advantages of this apparatus are that quick antimicrobial or electric work can be accomplished through the use thereof.

The superheated steam is then allowed to flow into a containment tunnel or chamber into which items to be treated are placed or fed. The generation of steam and the accumulation of steam in the chamber are done at atmospheric pressure, thereby avoiding the use of a boiler or the build-up of dangerous pressure. This type of generation and containment system thus offers a much safer and less expensive method of steam treatment where boilers and pressure resistant chambers, fixture and piping are required.

After generation, the superheated steam is projected into the containment area which may be a tunnel or simple chamber. The chamber may be straight in configuration or it may be bent or curved either side to side or up and down. Due to the entire process being accomplished at atmospheric pressure, thin, as well as thick, cross sections for the chamber are contemplated. The containment area need not be sealed. The apparatus is operated at atmospheric pressure, resulting in no dangerous pressures. An atmosphere of superheated steam or other fluid is envisioned, wherein the fluid does not enter under pressure and the items inside of the chamber are not forcefully contacted by the fluid. The items are enveloped by the fluid atmosphere and the properties of the superheated steam or other fluid are allowed to apply or shrink labels or packaging on to or around the items to be treated.

In one application items to be treated are held in the containment area or are passed through the steam atmosphere at a pre-determined speed or for a specific time to allow the labels to shrink on the items. The elevated temperature of the superheated steam permits much shorter hold times than current systems. Also, the nature of superheated steam eliminates many of the problems associated with the use of hot-air and boiler steam.

A contemplated method comprises generating steam, superheating the steam, projecting the superheated steam into a containment area and placing items to be treated or labeled into the containment are for a specified period of time. A conveyor system or belt(s) may be used to pass the items through the superheated steam atmosphere. The production and projection of the superheated steam continues throughout the process.

It is also anticipated that the apparatus and method may be employed without the use of a containment area. Handheld versions of instant steamers are presented above that can be used for direct application of superheated steam when the touch-up of a label that is wrinkled or flawed. Shrink control may easily be handled with the use of such a handheld device. Robotic devices may also be employed in the parts manipulations (loading, unloading of items, etc.).

A key part of the apparatus and method is related to boiling efficiency. It has been determined, for this apparatus, that liquid from a spritzer or atomizer (misting means) or in the form of a film applied to a hot surface are effective forms of liquid for the production of instant steam. It has also been found that 18 ml/min of atomized or misted water applied to a surface at a temperature greater than 100.degree. C. with a heat content of greater than 2 kJ will produce instantly boiled water at a rate of 1 kg/hr. The apparatus of this application teaches away from commonly known principles of boiling (Steam textbooks such as "Practical Guide to Steam Turbines" ISBN 13 978-007 150 8216 by Block and others).

In operation, water will be drawn from a reservoir and converted to a fine mist or into droplets by a spray control nozzle, or other means, and immediately injected onto hot surfaces or hot electric heating elements located within the steam chamber. Nozzle size can be 0.5 mil to 20 mil (1 mil=1/1000 inch). The water is not required to be heated before conversion to mist or injection into the generator but may be if desired. When the mist enters the chamber it will come into immediate contact with heated surfaces found within and be instantly converted into superheated steam. The hot surfaces may be made of materials including but not limited to metals, non-metals, semiconductors, ceramics, plastics, polymers composites and metal-like materials. The chamber will be insulated in such a manner as to allow the conversion of the water droplets into superheated steam. Insulation material used may be those commonly known to those skilled in the art. This apparatus and method provides a steam making rate that far surpasses that found in the prior art.

The high rate of steam production is accomplished in part due to the nature of atomized water. Tiny water droplets found in misted water may produce 1000 times its volume in steam when it comes in contact with heated surfaces. If these heated surfaces experience radiative, convective or conductive heat in an extremely well insulated chamber the steam may become superheated. The apparatus of the present application provides these conditions. The hot surfaces are high electron conductivity surfaces with electrons in the conduction band. The apparatus and method avoid line phase spinodals and produce a high purity gas that is waterless. The apparatus ascends $P_{sat}$, $T_{sat}$ and all spinodals along the two phase boundary of water/steam (See Cengel and Boles, Thermodynamics: An Engineering Approach, McGraw Hill, 6.sup.th edition 2011.). Mist and steam are allowed to pre-mix.

The apparatus and method of the present application require only the heating of a mist to steam. No heater is needed to heat the water to an initial gaseous state prior to superheating. The steam is truly produced on demand since no steam is ever present until the misting means is actuated and a mist of water is projected onto the hot surfaces providing instant steam. There is no wait as the steam is produced when the mist contacts the heated surfaces contained within the chamber. Current standard boilers have to be idled. Once the hot surfaces are at operating temperature the apparatus will instantly produce steam, and thus the only time needed is the time necessary to convert water to mist and contact the mist to the heated surfaces within the chamber.

A major feature of this apparatus and method is the instant conversion of liquid to gas. It is well known that boiling of a liquid is a difficult phenomenon when the liquid is confined within a container such as a can or a cup. This difficulty has been overcome by the embodiments of the instant superheated steam apparatus disclosed herein.

The mister is positioned at directly above the center of the heating element and the chamber base. This central positioning will permit the mist projected by the mister to come in contact with the entire heating element surfaces. The mister then projects the water mist or droplets onto a heated surface located directly below the mister.

The mister is designed and positioned to project the mist so that the entire heated surface is contacted. Further embodiments envision multiple misters employed to cover a greater area of heated surfaces. The vertical distance of the mister to the heated surfaces may be adjusted to obtain the optimal mist coverage to achieve the desired superheated steam generation efficiency. It is also anticipated that the mister, may be designed with various outlet configurations to give more or less of a fine mist, droplets or even a stream of water. The mister will be configured to produce various patterns or shapes of the area covered by it. The mister may be single or multiple headed. It may also be configured with venturi tubes to provide added pressure and velocity to the mist. The mist may be put down in a circular, semicircular, fan shape or linear pattern depending on the desired application needs and heated surface configurations.

FIGS. 1-6 represent an embodiment of the apparatus of the present application and picture a labeling apparatus 10 comprised of a fluid superheater 20 a containment chamber 40 into which superheated steam and items to be treated are introduced and a conveyance means 60. The conveyance means 60 may be supported by stand 15 and the apparatus may be controlled by controller 80.

The superheater 20 is connected to the chamber 40 by fluid connection 24 through fluid aperture 22 located through the top of chamber 40. Chamber 40 may be constructed of any suitable material capable of tolerating contact with a superheated fluid. The chamber 40 may be insulated as well to retain the heat of the superheated fluid and as a safety feature. In this embodiment the fluid aperture 22 is a single one located at the top of the chamber 40. However, multiple apertures at different positions are envisioned as well. Before heating, fluid, such as water, is contained in reservoir 26 and pumped by pump 28 to the superheater 20 where it is converted to a superheated fluid. The superheated steam generated by superheater 20 flows into the chamber 40 via fluid connection 24 without pressurization or other means of force.

Items are moved through the chamber 40 by a conveyance means 60, which, in this embodiment, is a conveyor belt passing through the chamber 40 via chamber entrance 42 and chamber exit 44. An embodiment without a conveyance means 60 is envisioned as well. A sealed chamber or a chamber with a door or flap, or flaps, is contemplated also. If desired, an auxiliary heater 100 may be attached to the chamber 40 to provide heated air to the system. In one embodiment the auxiliary heater 100 is positioned within the stand 15 underneath the chamber 40 and conveyance means 60. Power is provided to the labeling apparatus 10 by an external source of electricity through a power hookup 82 and transformer 84 regulated by controller 80. Multiple chambers 40 and conveyance means 60 are contemplated.

The above descriptions provide examples of specifics of possible embodiments and should not be used to limit the scope of all possible embodiments. Thus the scope of the embodiments should not be limited by the examples and descriptions given, but should be determined from the claims and their legal equivalents.

We claim:

1. An apparatus for the application of labels to items wherein the apparatus heat shrinks the labels to cover the items with the labels, comprising a means to superheat a liquid, a chamber and a fluid aperture communicating between the means to superheat the liquid and the chamber, wherein the fluid aperture is configured to allow the unpressurized introduction of an atmosphere of superheated fluid in which the items are entirely enveloped by and unforcefully contacted by the superheated fluid, wherein the chamber is configured to contain the atmosphere of superheated fluid after the liquid has been superheated into the superheated fluid, wherein the chamber is further configured to accept and hold the items and the labels to be treated by the superheated fluid, wherein the means to superheat a liquid comprises a bare electrically coupled heating element, a misting means to convert the liquid into a droplet form positioned directly above the bare electrically coupled heating element, wherein the liquid in the droplet form is projected by the misting means and falls downward into direct contact with the bare electrically coupled heating element due to the positioning of the misting means above the bare electrically coupled heating element, thereby superheating the liquid.

2. The apparatus of claim 1 wherein the chamber is comprised of an entrance and an exit and wherein the apparatus is further comprised of a conveyance means positioned to move through the chamber by way of the entrance and exit thereby allowing items to be transported through the chamber and the atmosphere contained therein.

3. The apparatus of claim 1 further comprising a superheated fluid line between the means to superheat the liquid and the fluid aperture passing through the chamber wall wherein the chamber and the fluid aperture are configured to create an atmosphere of superheated fluid which surrounds the items within the chamber.

4. The apparatus of claim 1 wherein the means to superheat the liquid is a steam superheater wherein the liquid is superheated at atmospheric pressure and wherein the superheated fluid is applied at atmospheric pressure.

5. The apparatus of claim 1 further comprising an auxiliary heater positioned to heat the superheated fluid within the chamber.

6. The apparatus of claim 1 wherein the chamber is curved.

7. The apparatus of claim 1 having more than one chamber.

8. The apparatus of claim 2 having more than one conveyance means.

9. The apparatus of claim 1 wherein the speed of the conveyance means is adjustable.

10. The apparatus of claim 1 wherein the superheated fluid has a temperature of over 300 C.°.

\* \* \* \* \*